United States Patent
Miyatani

(10) Patent No.: US 8,349,042 B2
(45) Date of Paterit: Jan. 8, 2013

(54) POLISHING LIQUID AND POLISHING METHOD

(75) Inventor: Katsuaki Miyatani, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/074,046

(22) Filed: Mar. 29, 2011

(65) Prior Publication Data

US 2011/0175018 A1    Jul. 21, 2011

Related U.S. Application Data

(63) Continuation of application No. PCT/JP2009/066810, filed on Sep. 28, 2009.

(30) Foreign Application Priority Data

Oct. 1, 2008    (JP) ................................. 2008-256322

(51) Int. Cl.
B24D 3/02 (2006.01)
C09C 1/68 (2006.01)
C09K 3/14 (2006.01)

(52) U.S. Cl. .............. 51/307; 51/308; 51/309; 438/690; 438/691; 438/692; 438/693

(58) Field of Classification Search ......................... None
See application file for complete search history.

(56) References Cited

U.S. PATENT DOCUMENTS 8,093,195 B2 * 1/2012 Uhl et al. ...................... 510/221
2007/0251270 A1 * 11/2007 Miyatani et al. .................. 65/31

FOREIGN PATENT DOCUMENTS

| JP | 2006-007399 | 1/2006 |
| JP | 2006-306924 | 11/2006 |
| JP | 2006-315160 | 11/2006 |
| JP | 2007-191696 | 8/2007 |
| JP | 2008-105168 | 5/2008 |
| JP | 2008-181954 | 8/2008 |

OTHER PUBLICATIONS

Machined translation of JP 2006-315160.*
International Search Report issued Nov. 17, 2009 in PCT/JP09/066810 filed Nov. 4, 2009.
U.S. Appl. No. 13/093,195, Apr. 25, 2011, Miyatani.

* cited by examiner

*Primary Examiner* — Duy Deo
(74) *Attorney, Agent, or Firm* — Oblon, Spivak, McClelland, Maier & Neustadt, L.L.P.

(57) ABSTRACT

The present invention relates to a polishing slurry including: a colloidal silica having an average particle size of 40 nm or more; water; and a ζ potential adjusting component, in which the ζ potential adjusting component includes at least one water-soluble organic polymer selected from a water-soluble polyether polyamine and a water-soluble polyalkylene polyamine and at least one acid selected from hydrochloric acid, sulfuric acid, nitric acid, nitrous acid and amidosulfuric acid, and the ζ potential adjusting component contains the acid at a ratio of from 0.6 to 1.4 to the water-soluble organic polymer in terms of molar ratio, and the polishing slurry has a pH of 8 or more.

8 Claims, 2 Drawing Sheets

POLISHING LIQUID AND POLISHING METHOD

CROSS-REFERENCE TO RELATED APPLICATIONS

This application is a Continuation of PCT/JP09/066,810 filed Sep. 28, 2009. This application is based upon and claims the benefit of priority from Japanese Patent Application No. 2008-256322 filed Oct. 1, 2008.

TECHNICAL FIELD

The present invention relates to a polishing slurry used for polishing a flat plate or the like, such as a glass substrate or a semiconductor substrate where a silica thin film is formed on the surface thereof, and a method for polishing a flat plate or the like by using the polishing slurry.

BACKGROUND ART

In a polishing step of a glass substrate which is used for manufacturing a hard disk, a photomask or the like and requires high-precision smoothness, a colloidal silica-containing polishing slurry (colloidal silica slurry) has been used. However, the polishing step using the colloidal silica slurry has a slow polishing rate, compared to conventional polishing steps using cerium oxide, and is applied to only finish polishing in many cases. Accordingly, various attempts have been made as methods for increasing the polishing rate (for example, see Patent Documents 1 and 2).

BACKGROUND ART DOCUMENT

Patent Documents

Patent Document 1: JP-A-2006-7399
Patent Document 2: JP-A-2007-191696

SUMMARY OF THE INVENTION

Problems that the Invention is to Solve

However, in the methods described in Patent Document 1 and Patent Document 2, the colloidal silica slurry is adjusted to the acidic side, so that there is a concern that when the glass substrate contains alkali metal oxides or alkaline earth metal oxides (typically, when the glass substrate contains these oxides in an amount of 1 mol % or more), alkali metal components or alkaline earth metal components are eluted during polishing. As a result, the pH of the slurry changes to depart from a metastable region of the colloidal silica slurry, resulting in coagulation of colloidal silica to gel the slurry, which causes a possibility of the occurrence of a defect such as a failure of polishing to proceed.

An object of the invention is therefore to enhance the polishing rate, when a flat plate or the like, such as a glass substrate, is polished using a colloidal silica-containing polishing slurry, without adjusting the polishing slurry to the acidic side, thereby enhancing the polishing efficiency.

Means for Solving the Problems

The present inventors have thought that the polishing rate may be increased if the contact probability of the glass substrate and colloidal silica can be increased in an alkaline region in which the dispersibility of colloidal silica is stable. Accordingly, from the viewpoint of maintaining the dispersibility of colloidal silica particles, there have been studied methods for decreasing electrical repulsive force between the colloidal silica particles and the glass substrate without decreasing the electrical repulsive force among the colloidal silica particles, and it has been found that addition of a specific potential adjusting component such as a specific electrolyte to a polishing slurry decreases the electrical repulsive force between the colloidal silica particles and the glass substrate to increase the polishing rate. Further, as a technique for evaluating the electrical repulsive force, attention has been focused on measurement of the $\zeta$ potential of a glass substrate surface, and it has been found that the polishing rate is also enhanced with an increase in the $\zeta$ potential, thus leading to the invention.

That is to say, the invention provides the following polishing slurry, polishing method and method for manufacturing a glass substrate for a magnetic disk.

(1) A polishing slurry comprising:
   a colloidal silica having an average particle size of 40 nm or more;
   water; and
   a $\zeta$ potential adjusting component,
   wherein the $\zeta$ potential adjusting component comprises at least one sodium salt selected from the group consisting of sodium nitrate and sodium sulfate, and
   the polishing slurry has a pH of 8 or more.

(2) A polishing slurry comprising:
   a colloidal silica having an average particle size of 40 nm or more;
   water; and
   a $\zeta$ potential adjusting component,
   wherein the $\zeta$ potential adjusting component comprises at least one water-soluble organic polymer selected from the group consisting of a water-soluble polyether polyamine and a water-soluble polyalkylene polyamine and at least one acid selected from the group consisting of hydrochloric acid, sulfuric acid, nitric acid, nitrous acid and amidosulfuric acid, and the $\zeta$ potential adjusting component contains the acid at a ratio of from 0.6 to 1.4 to the water-soluble organic polymer in terms of molar ratio, and
   the polishing slurry has a pH of 8 or more.

(3) The polishing slurry according to (1), wherein a content of the sodium salt is from 0.01 to 0.4 mol/L.

(4) The polishing slurry according to (2), wherein a content of the water-soluble organic polymer is from 0.0001 to 0.5 mol/L.

(5) The polishing slurry according to any one of (1) to (4), wherein the colloidal silica has an average particle size of from 100 nm or less.

(6) The polishing slurry according to any one of (1) to (5), wherein the polishing slurry has a pH of from 9 to 10.

(7) A polishing method comprising a step of polishing an object to be polished, by using the polishing slurry according to any one of (1) to (6).

(8) The polishing method according to (7), wherein, in the step, a $\zeta$ potential of a surface of the object to be polished is adjusted to −90 mV or more.

(9) The polishing method according to (7) or (8), wherein the object to be polished comprises silicate glass, quartz glass or quartz, or a surface to be polished of the object to be polished contains silicic acid or a silicate.

(10) A method for manufacturing a glass substrate for a magnetic disk, the method comprising the polishing method according to (7), (8) or (9).

FIG. 1 is a graph showing relationships between the electrolyte concentration (the electrolyte is sodium nitrate) of the polishing slurry having a pH of 9 and the $\zeta$ potential of the glass substrate surface and between the electrolyte concentration and the $\zeta$ potential of colloidal silica. As shown in the figure, for the electrolyte-free polishing slurry, the glass substrate surface has a large potential in minus, and the glass substrate and colloidal silica are in a state where they are difficult to contact with each other. Compared to this, the $\zeta$ potential of the glass substrate surface increases with an increase in the electrolyte concentration, resulting in easy contact of the glass substrate with colloidal silica. In particular, when the electrolyte concentration reaches 0.1 mol/L, the $\zeta$ potential of the glass substrate surface becomes almost the same as the $\zeta$ potential of colloidal silica, resulting in easier contact. Further, the $\zeta$ potential of colloidal silica scarcely changes depending on the case where the electrolyte is added and the case where it is not added, which shows that addition of the electrolyte does not exert an influence on a dispersed state of colloidal silica.

Advantage of the Invention

According to the invention, a flat plate or the like, such as a glass substrate, can be polished at a high polishing rate by using colloidal silica.

Further, although a glass substrate for a magnetic disk usually contains alkali metal oxides or alkaline earth metal oxides, when such a glass substrate is polished with the polishing slurry of the invention, coagulation of colloidal silica as described previously becomes difficult to occur.

MODE FOR CARRYING OUT THE INVENTION

Figure 1:
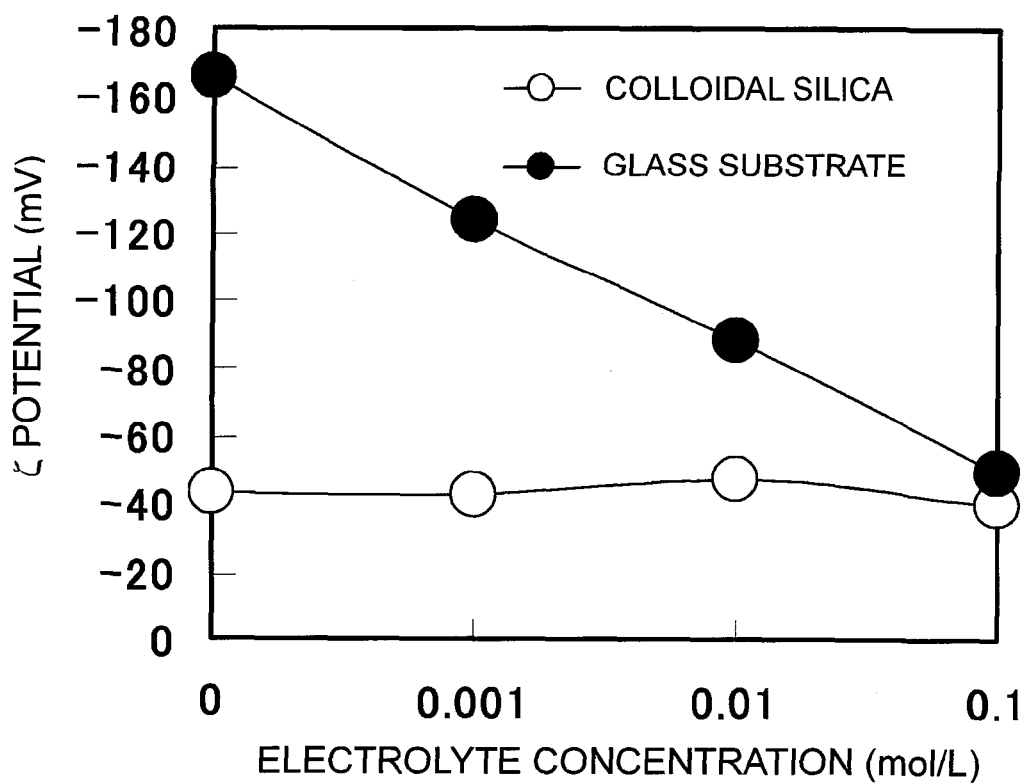
FIG. 1 is a figure for illustrating a principle of the invention, and is a graph showing relationships between the electrolyte concentration of a polishing slurry and the $\zeta$ potential of a glass substrate surface and between the electrolyte concentration and the $\zeta$ potential of colloidal silica.

The invention will be described in detail below taking manufacturing of a glass substrate for a magnetic disk (a glass substrate for a hard disk) as an example.

In general, the glass substrate for a magnetic disk (hereinafter occasionally merely referred to as the "glass substrate") is manufactured through respective steps as listed below. That is to say, a circular hole is cored in the center of a circular glass plate, followed by successively performing chamfering, main surface lapping and edge mirror polishing. Thereafter, the circular glass plates thus processed are laminated, and an inner peripheral edge is etched. The etched inner peripheral edge is coated, for example, with a polysilazane compound-containing liquid by a spray method or the like, followed by firing to form a coating film (protective coating film) on the inner peripheral edge. Subsequently, the main surface of the circular glass plate having the coating film formed on the inner peripheral edge is polished to form a flat and smooth surface, thereby accomplishing the glass substrate.

Further, brush polishing of the inner peripheral edge may be performed in place of the formation of the protective film on the inner peripheral edge. The main surface lapping step may be divided into a rough lapping step and a precise lapping step, and a shape-processing step (hole-coring in the center of the circular glass plate, chamfering and edge polishing) may be provided between these steps. A chemical strengthening step may also be provided after the main surface lapping step. Incidentally, in the case of manufacturing a glass substrate having no circular hole in the center thereof, hole-coring in the center of the circular glass plate is not needed, as a matter of course.

The main surface lapping is usually performed using an aluminum oxide abrasive or an aluminum oxide-based abrasive, having an average particle size of from 6 to 8 μm. The lapped main surface is usually polished to a removal of from 30 to 40 μm, and thereafter polished using the polishing slurry of the invention typically to a surface roughness Ra of 0.16 nm or less.

In the polishing of the main surface, first, the polishing is performed using a polishing slurry containing cerium oxide having an average particle size of from 0.15 to 0.25 μm and a urethane polishing pad to adjust the surface roughness Ra to 0.4 to 0.6 nm and the microwaviness (Wa) measured in a range of 1 mm×0.7 mm under a condition of a wavelength region of $\lambda \leqq 0.25$ mm using a three-dimensional surface structure analyzing microscope (for example, NV200 manufactured by Zygo Co., Ltd.), for example, to 0.2 nm or less. The decrease amount of the thickness (removal amount) in the polishing is typically from 1 to 2 μm.

Next, the main surface is further polished, for example, under a condition of a polishing pressure of from 0.5 to 30 kPa using the polishing slurry of the invention. Incidentally, the polishing pressure is preferably 4 kPa or more. When the polishing pressure is less than 4 kPa, the stability of the glass substrate at the time of the polishing deteriorates, resulting in a tendency to flop. As a result, there is a concern that the waviness of the main surface becomes large.

The polishing pad used is typically composed of a foamed urethane resin having a shore D hardness of from 45 to 75, a compressibility of from 0.1 to 10% and a density of from 0.5 to 1.5 g/cm$^3$, a foamed urethane resin having a shore A hardness of from 30 to 99, a compressibility of from 0.5 to 10% and a density of from 0.2 to 0.9 g/cm$^3$, or a foamed urethane resin having a shore A hardness of from 5 to 65, a compressibility of from 0.1 to 60% and a density of from 0.05 to 0.4 g/cm$^3$. Incidentally, the shore A hardness of the polishing pad is preferably 20 or more. When it is less than 20, there is a concern that the polishing rate decreases.

Incidentally, the shore D hardness and the shore A hardness are each measured by methods for measuring durometer A hardness and D hardness of plastics as specified in JIS K7215, respectively. Further, the compressibility (unit: %) is measured as follows. That is to say, with respect to a test specimen cut out from the polishing pad in a proper size, the thickness t0 of the material at the time when a stress of 10 kPa as a load is applied for 30 seconds from a non-loaded state by a shopper type thickness meter is determined, and then the thickness t1 of the material at the time when a stress of 110 kPa as a load is applied for 5 minutes immediately from the state where the thickness is t0 is determined. From the values of t0 and t1, (t0−t1)×100/t0 is calculated, and this is taken as the compressibility.

Incidentally, in the measurement of the shore D hardness and the shore A hardness of the polishing pad, the polishing pad specimens are laminated, and the hardness thereof is measured. Accordingly, there is a concern that it is improper as the hardness of the polishing pad governing a polishing phenomenon. It is therefore preferred that the hardness measured using an IRHD micro detector of a general-purpose automatic hardness meter for rubber, Digitest, manufactured by H. Barleys Company (hereinafter referred to as the IRHD hardness) is taken as the hardness of the polishing pad. The IRHD hardness of the polishing pad is preferably from 20 to 80.

The polishing slurry of the invention has a pH of 8 or more, so that the coagulation of colloidal silica as described above is difficult to occur. The pH thereof is preferably 9 or more. Further, the pH is typically 10 or less. A pH exceeding 10 results in a tendency for the polishing pad to be corroded when the polishing pad is made of urethane.

Components of the polishing slurry of the invention will be described below.

Although the kind of colloidal silica is not limited, it is generally prepared by a water glass method. The average particle size of colloidal silica is 40 nm or more, and preferably from 40 nm to 100 nm. When it is less than 40 nm, there is a concern that colloidal silica is coagulated. When it exceeds 100 nm, production cost of colloidal silica is high, which causes an economical disadvantage. The average particle size of colloidal silica is more preferably more than 40 nm. Further, the content of colloidal silica in the polishing slurry is typically from 5 to 40% by mass, and more preferably from 10 to 15% by mass.

A medium is a so-called aqueous medium, and the polishing slurry of the invention contains water.

The $\zeta$ potential adjusting component is a component for adjusting the $\zeta$ potential of the glass substrate surface at the time of bringing the polishing slurry of the invention into contact with the glass substrate preferably to −90 mV or more while keeping the $\zeta$ potential of colloidal silica almost constant. When the $\zeta$ potential of the glass substrate surface at the time of bringing the polishing slurry of the invention into contact with the glass substrate (this $\zeta$ potential is hereinafter described as $\zeta S$) is less than −90 mV, the effect due to a decrease in electrical repulsive force decreases, resulting in a difficulty in increasing the polishing rate. More preferably, $\zeta S$ is −50 mV or more.

Figure 2:
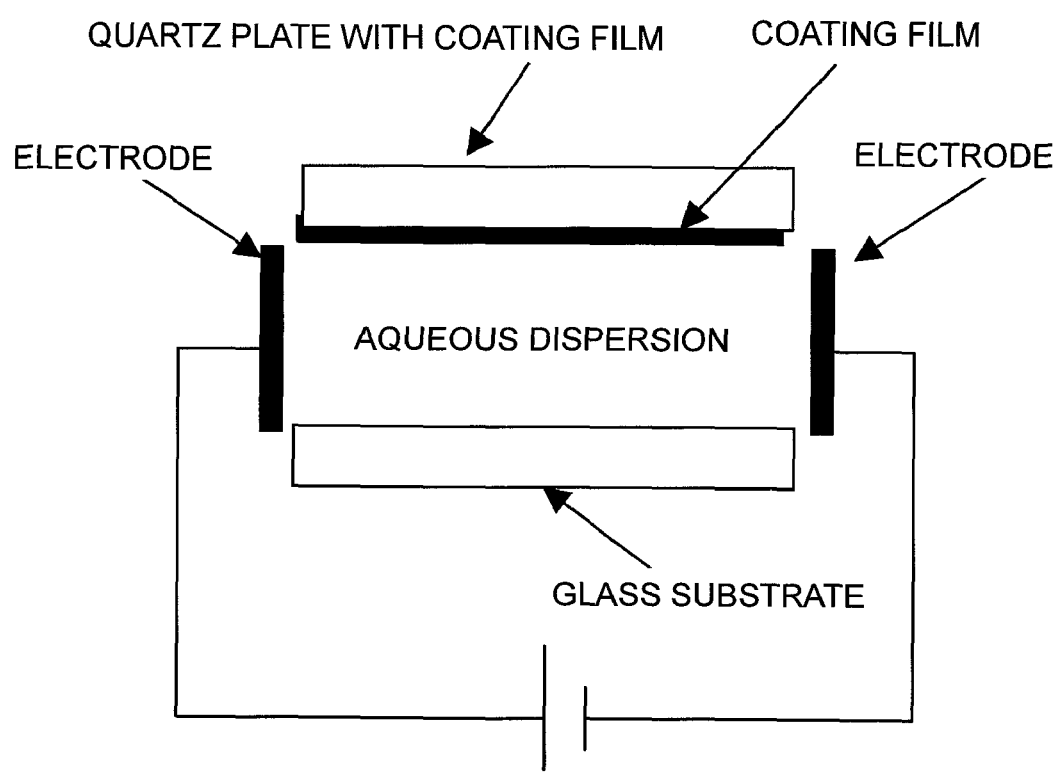
FIG. 2 is a schematic view showing a device for measuring the $\zeta$ potential of the glass substrate surface.

Incidentally, in order to measure $\zeta S$ in the invention, a simulant liquid of polishing slurry containing latex particles in place of colloidal silica is placed in a cell in which the glass substrate and a quartz plate with coating film ($\zeta$ potential: 0 mV) are arranged facing each other at a predetermined distance and electrodes are each further arranged on both sides of a gap between the glass substrate and the quartz plate with coating film as schematically shown in FIG. 2, and the electrophoresis rate of the latex particles at each height between the glass substrate and the quartz plate with coating film is measured by the Doppler method. Then, the difference between the electrophoresis rate of the latex particles at a position close to the glass substrate and the electrophoresis rate of the latex particles at a position close to the quartz plate with coating film is determined and taken as the $\zeta$ potential of the glass substrate. As a measuring device of $\zeta S$ based on such a principle, there can be used, for example, a $\zeta$ potential measuring system, ELSZ-1, manufactured by Otsuka Electronics Co., Ltd., among commercially available products.

The reason for measuring the $\zeta$ potential of the glass substrate using the simulant liquid of polishing slurry containing the latex particles, not using the polishing slurry containing colloidal silica, is as follows. That is to say, when the slurry containing colloidal silica is used, the $\zeta$ potential changes due to the pH thereof, which poses a problem that the change must be taken into consideration in calculating the $\zeta$ potential of the glass substrate. Compared to this, the latex particles have the properties of having a constant $\zeta$ potential in the whole pH region (pH 2 to 12) in which the pH can be measured with the $\zeta$ potential measuring device and maintaining a monodisperse state to cause no coagulation, so that the foregoing problem does not arise.

As the $\zeta$ potential adjusting component, there is used (1) one comprising at least one sodium salt selected from the group consisting of sodium nitrate and sodium sulfate or (2) one (a mixture) comprising at least one water-soluble organic polymer selected from the group consisting of a water-soluble polyether polyamine and a water-soluble polyalkylene polyamine and at least one acid selected from the group consisting of hydrochloric acid, sulfuric acid, nitric acid, nitrous acid and amidosulfuric acid.

The reason for using sodium nitrate or sodium sulfate as the $\zeta$ potential adjusting component is that $\zeta S$ is easily increased while keeping the $\zeta$ potential of the colloidal silica almost constant, and that a salt formed by an alkali metal component or an alkaline earth metal component eluted from the glass containing the alkali metal oxide or the alkaline earth metal oxide into the polishing slurry and an anion component of the sodium salt is easily soluble in water, so that the contact between colloidal silica and the glass substrate is a little disturbed by the salt.

When one or both of these sodium salts are used as the $\zeta$ potential adjusting component, the total contents thereof is preferably from 0.01 to 0.4 mol per litter of polishing slurry, namely from 0.01 to 0.4 mol/L. When it is less than 0.01 mol/L, there is a concern that it becomes difficult to increase $\zeta S$. More preferably, it is 0.05 mol/L or more, and typically, it is 0.08 mol/L or more. When it exceeds 0.4 mol/L, the $\zeta$ potential of the colloidal silica decreases, resulting in a tendency to coagulate. More preferably, it is 0.3 mol/L or less, and typically, it is 0.2 mol/L or less.

The reason for using the one comprising the water-soluble organic polymer and acid as the $\zeta$ potential adjusting component is that the water-soluble organic polymer (hereinafter occasionally merely referred to as the water-soluble organic polymer) has amine groups on both ends, and acts as an electrolyte by coexistence thereof with the acid to increase $\zeta S$ similarly to sodium nitrate, whereby $\zeta S$ is easily increased while keeping the $\zeta$ potential of the colloidal silica almost constant.

When the water-soluble organic polymer and the acid are used as the $\zeta$ potential adjusting component, the content of water-soluble organic polymer is preferably from 0.0001 to 0.5 mol/L. When it is less than 0.0001 mol/L, there is a concern that it becomes difficult to increase $\zeta S$ while keeping the $\zeta$ potential of the colloidal silica almost constant. More preferably, it is 0.0002 mol/L or more, and typically, it is 0.0005 mol/L or more. When it exceeds 0.5 mol/L, there is a concern that colloidal silica tends to coagulate. More preferably, it is 0.1 mol/L or less.

In view of dispersibility to colloidal silica, the weight average molecular weight of the water-soluble polyether polyamine is preferably from 100 to 2,000, more preferably from 100 to 1,000, and still more preferably from 200 to 900. For the same reason, the weight average molecular weight of the water-soluble polyalkylene polyamine is preferably from 100 to 2,000, more preferably from 100 to 1,000, and still more preferably from 200 to 1,000.

The polyether polyamine means a compound having two or more amino groups and two or more ethereal oxygen atoms. The amino group is preferably a primary amino group (—$NH_2$). The polyether polyamine in the invention is preferably a compound having two or more primary amino groups and substantially no other amino group, and particularly a polyether diamine having only two primary amino groups, although it may have a secondary amino group (—NH—) or a tertiary amino group as the amino group. The polyether polyamine is preferably a compound having a structure in which hydrogen atoms of hydroxyl groups of a polyhydric alcohol or a polyether polyol are substituted by aminoalkyl groups. The polyhydric alcohol is preferably a dihydric to hexahydric alcohol, and particularly preferably a dihydric alcohol. The polyether polyol is preferably a dihydric to hexahydric polyoxyalkylene polyol, and particularly preferably a polyoxyalkylene diol. The aminoalkyl group is preferably an aminoalkyl group having 2 to 6 carbon atoms, such as a 2-aminoethyl group, a 2-aminopropyl group, a 2-amino-1-methylethyl group, a 3-aminopropyl, a 2-amino-1,1-dimethylethyl group or a 4-aminobutyl group.

The polyalkylene polyamine means a compound in which three or more amino groups are each bound through an alkylene group. It is preferred that the terminal amino group is a primary amino group, and that the intramolecular amino group is a secondary amino group. More preferred is a linear polyalkylene polyamine having primary amino groups on both molecular ends and one or more secondary amino groups in a molecule. There are present three or more binding moieties in a molecule, which are each put between an amino group and another amino group and composed of an alkylene group. These plural binding moieties between amino groups may be the same or different from one another. It is preferred that all are the same or that two binding moieties between amino groups binding to the primary amino groups on both ends are the same and different from the other binding moiety (or moieties) between amino groups. The number of carbon atoms contained in one binding moiety between amino groups is preferably from 2 to 8. In particular, it is preferred that the number of carbon atoms contained in each of two binding moieties between amino groups binding to the primary amino groups on both ends is from 2 to 8 and that the number of carbon atoms contained in each of the other binding moieties between amino groups is from 2 to 6.

The polyether diamine and polyalkylene polyamine are preferably compounds having a structure represented by the following formula (1):

$$H_2N-(R-X-)_k-R-NH_2 \quad (1)$$

wherein R represents an alkylene group having 2 to 8 carbon atoms, X represents an oxygen atom or —NH—, k represents an integer of 2 or more in the case of the polyether diamine and an integer of 1 or more in the case of the polyalkylene polyamine, and a plurality of Rs in one molecule thereof may be different from each other.

In particular, the polyether diamine is preferably a compound having a structure represented by the following formula (2), and the polyalkylene polyamine is preferably a compound having a structure represented by the following formula (3):

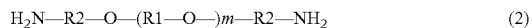

$$H_2N-R2-O-(R1-O-)_m-R2-NH_2 \quad (2)$$

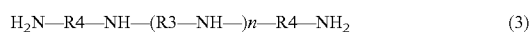

$$H_2N-R4-NH-(R3-NH-)_n-R4-NH_2 \quad (3)$$

wherein R1 represents an ethylene group or a propylene group, R2 represents an alkylene group having 2 to 6 carbon atoms, R3 represents an alkylene group having 2 to 6 carbon atoms, R4 represents an alkylene group having 2 to 8 carbon atoms, m represents an integer of 1 or more, n represents an integer of 1 or more, R1 and R2 may be the same or different, and R3 and R4 may be the same or different.

Specific examples of the polyether diamines represented by formula (2) include polyoxypropylenediamine (a compound in which R1 and R2 are propylene groups and m is 1 or more), polyoxyethylenediamine (a compound in which R1 and R2 are ethylene groups and m is 1 or more), 4,7,10-trioxatridecane-1,13-diamine (a compound in which R1 is an ethylene group, R2 is a trimethylene group and m is 2) and the like. Specific examples of the polyalkylene polyamines represented by formula (3) include tetraethylenepentamine (a compound in which R3 and R4 are ethylene groups and n is 2), pentaethylenehexamine (a compound in which R3 and R4 are ethylene groups and n is 3), heptaethyleneoctamine (a compound in which R3 and R4 are ethylene groups and n is 5), N,N'-bis(3-aminopropyl)-ethylenediamine (a compound in which R3 is an ethylene group, R4 is a trimethylene group and n is 1), N,N'-bis(2-aminoethyl)-1,4-butanediamine (a compound in which R3 is a tetramethylene group, R4 is an ethylene group and n is 1) and the like.

By using these polyether polyamines and polyalkylene polyamines, convex portions on the glass substrate surface come to be selectively easily ground due to the amino groups or the amine salt groups in the molecule, thereby decreasing Ra.

The reason why the acid used together with the water-soluble organic polymer is limited to the foregoing six acids is that the solubility in water of the salts formed by the anions of these acids and the alkali metal ions or the alkaline earth metal ions is high, so that the contact between colloidal silica and the glass substrate is a little disturbed by the foregoing salts even when the glass to be polished contains the alkali metal oxides or the alkaline earth metal oxides.

The molar ratio of the content of the water-soluble organic polymer and the total content of the foregoing six acids is within the range of from 1:0.6 to 1:1.4. That is to say, the content ratio of the acids to the water-soluble organic polymer is from 0.6 to 1.4 in terms of molar ratio. Outside this range, colloidal silica tends to coagulate. This molar ratio is typically from 0.8 to 1.2.

The invention has been described above based on the glass substrate. However, in addition to that, the invention can also be applied, for example, for removal use of a silica passivation film of a semiconductor substrate protected with the silica passivation film. Conventionally, polishing of the semiconductor substrate protected with the silica passivation film has been performed using a colloidal silica-containing polishing slurry, and polishing can be similarly performed using the polishing slurry of the invention to remove the silica passivation film.

Further, the polishing slurry of the invention is suitable for polishing of silicate glass, particularly silicate glass containing the alkali metal oxides or the alkaline earth metal oxides in an amount of 1 mol % or more. However, not limited thereto, it may be applied to other glass such as quartz glass, quartz and the like.

EXAMPLES

The invention will be further described below with reference to Examples and Comparative Examples.

(Preparation of Glass Substrate)

A silicate glass plate (the contents indicated by mol % were $Na_2O$: 5%, $K_2O$: 8% and MgO: 11%) formed by a float process was processed into such a doughnut-shaped circular glass plate (circular glass plate having a circular hole in the center thereof) that a glass substrate having an outer diameter of 65 mm, an inner diameter of 20 mm and a thickness of 0.635 mm was obtained. Incidentally, grinding processing of the inner peripheral surface and the outer peripheral surface was performed using a diamond grindstone, and lapping of upper and lower surfaces of the glass plate was performed using an aluminum oxide abrasive.

Subsequently, inner and outer peripheral edges were subjected to chamfering processing to a chamfering width of 0.15 mm and a chamfering angle of 45°. After the processing of the inner and outer peripheral edges, mirror polishing of the edges was performed by brush polishing using a cerium oxide slurry as an abrasive and a brush as a polishing tool. The processing amount was 30 μm in terms of the removal amount in a radial direction.

Thereafter, polishing processing of the upper and lower main surfaces was performed with a double side polishing machine using a cerium oxide slurry (the average particle size of cerium oxide: about 1.1 μm) as an abrasive and a urethane pad as a polishing tool. The processing amount was 35 μm in total in a thickness direction of the upper and lower main surfaces.

Further, polishing processing of the upper and lower main surfaces was performed with a double side polishing machine using, as an abrasive, cerium oxide (average particle size: about 0.2 μm) having an average particle size smaller than the foregoing cerium oxide and a urethane pad as a polishing tool. The processing amount was 1.6 μm in total in a thickness direction of the upper and lower surfaces. The main surface of the circular glass plate thus prepared was measured using an AFM manufactured by Veeco Inc. As a result, the surface roughness Ra thereof was 0.48 nm.

Example 1

50 mL of a 1 M-$NaNO_3$ aqueous solution was added to 325 mL of distilled water, followed by stirring. 125 mL of colloidal silica (trade name: ST-XL, manufactured by Nissan Chemical Industries, Ltd.) having an average particle size of 50 nm was added thereto with stirring to prepare a test slurry A. The colloidal silica content of this test slurry A was 12% by mass, the $NaNO_3$ content thereof was 0.1 mol/L, and the pH thereof was 9.41.

Then, a main surface of the glass substrate was polished at a polishing pressure of 12 kPa and a platen rotation number of 40 rpm for 20 minutes, using the slurry as an abrasive, using as a polishing tool a polishing pad composed of a foamed polyurethane resin having an IRHD hardness of 55.5, a shore A hardness of 53.5°, a compressibility of 1.9% and a density of 0.24 g/cm$^3$, and using FAM12B manufactured by Speedfam Co., Ltd.

After the glass substrate was polished, the following cleaning processes were performed. That is to say, pure water shower cleaning, scrub cleaning with BELLCLEAN and an alkaline detergent, scrub cleaning with BELLCLEAN and water and pure water shower cleaning were successively performed, and thereafter, air blowing was performed. Then, the weight thereof was measured, and the polishing rate was calculated from the decreased amount of weight. As a result, it was 0.102 μm/min.

Further, the $\zeta S$ at this time was measured in the following manner. That is to say, 50 mL of a 1 M-$NaNO_3$ aqueous solution was added to 325 mL of distilled water, followed by stirring. An aqueous solution of latex particles (average particle size: 204 nm) having a solid concentration of 0.01% was added thereto in a proper amount with stirring to obtain a dispersion. Then, a cell was connected to a $\zeta$ potential evaluating device (having the same structure as shown in FIG. 2) manufactured by Otsuka Electronics Co., Ltd. In this case, a soda lime glass was located as a glass substrate of the cell. Then, the dispersion previously prepared was placed in the device, and the $\zeta$ potential $\zeta S$ of the glass substrate was measured. As a result, $\zeta S$ was −48.93 mV.

Example 2

50 mL of a 1 M-$Na_2SO_4$ aqueous solution was added to 325 mL of distilled water, followed by stirring. 125 mL of colloidal silica (trade name: ST-XL, manufactured by Nissan Chemical Industries, Ltd.) having an average particle size of 50 nm was added thereto with stirring. Thus, a test slurry B was prepared. The colloidal silica content of this test slurry B was 12% by mass, the $NaSO_4$ content thereof was 0.1 mol/L, and the pH thereof was 9.27.

Then, polishing was performed for 20 minutes in the same manner as in Example 1 with the exception that the test slurry B was used, and the polishing rate was calculated. As a result, it was 0.088 μm/min.

Further, $\zeta S$ at this time was measured in the following manner. That is to say, 50 mL of a 1 M-$Na_2SO_4$ aqueous solution was added to 325 mL of distilled water, followed by stirring. An aqueous solution of latex particles (average particle size: 204 nm) having a solid concentration of 0.01% was added thereto in a proper amount with stirring to obtain a dispersion. Then, $\zeta S$ was measured in the same manner as in Example 1. As a result, was −13.56 mV.

Comparative Example 1

125 mL of colloidal silica (trade name: ST-XL, manufactured by Nissan Chemical Industries, Ltd.) having an average particle size of 50 nm was added to 375 mL of distilled water with stirring to prepare a test slurry a. The colloidal silica content of this test slurry a was 12% by mass, and the pH thereof was 9.89.

Then, polishing was performed for 20 minutes in the same manner as in Example 1 with the exception that the test slurry a was used, and the polishing rate was calculated. As a result, it was 0.072 μm/min.

Further, as a result of measurement of $\zeta S$, it was −165.56 mV.

That is to say, in Examples 1 and 2, $\zeta S$ was −50 mV or more, and the polishing rate was 0.088 μm/min or more. Compared to this, in Comparative Example 1, $\zeta S$ was less than −50 mV, and the polishing rate was lower than that in Examples 1 and 2.

Example 3

5 mL of a 1 M-$NaNO_3$ aqueous solution was added to 370 mL of distilled water, followed by stirring. 125 mL of colloidal silica (trade name: ST-ZL, manufactured by Nissan Chemical Industries, Ltd.) having an average particle size of 80 nm was added thereto with stirring. Thus, a test slurry C was prepared. The colloidal silica content of this test slurry C was 12% by mass, the $NaNO_3$ content thereof was 0.01 mol/L, and the pH thereof was 9.30.

Then, polishing was performed for 20 minutes in the same manner as in Example 1 with the exception that the test slurry C was used, and the polishing rate was calculated. As a result, it was 0.054 μm/min.

Further, $\zeta$ at this time was measured in the following manner. That is to say, 5 mL of a 1 M-$NaNO_3$ aqueous solution was added to 370 mL of distilled water, followed by stirring. An aqueous solution of latex particles (average particle size: 204 nm) having a solid concentration of 0.01% was added thereto in a proper amount with stirring to obtain a dispersion.

Then, ζS was measured in the same manner as in Example 1. As a result, ζS was −88.09 mV.

Example 4

50 mL of a 1 M-NaNO$_3$ aqueous solution was added to 325 mL of distilled water, followed by stirring. 125 mL of colloidal silica (trade name: ST-ZL, manufactured by Nissan Chemical Industries, Ltd.) having an average particle size of 80 nm was added thereto with stirring. Thus, a test slurry D was prepared. The colloidal silica content of this test slurry D was 12% by mass, the NaSO$_4$ content thereof was 0.1 mol/L, and the pH thereof was 9.13.

Then, polishing was performed for 20 minutes in the same manner as in Example 1 with the exception that the test slurry D was used, and the polishing rate was calculated. As a result, it was 0.070 μm/min.

Further, ζS at this time was measured in the following manner. That is to say, 50 mL of a 1 M-NaNO$_3$ aqueous solution was added to 325 mL of distilled water, followed by stirring. An aqueous solution of latex particles (average particle size: 204 nm) having a solid concentration of 0.01% was added thereto in a proper amount with stirring to obtain a dispersion. Then, ζS was measured in the same manner as in Example 1. As a result, ζS was −48.93 mV.

Comparative Example 2

125 mL of colloidal silica (trade name: ST-ZL, manufactured by Nissan Chemical Industries, Ltd.) having an average particle size of 80 nm was added to 375 mL of distilled water with stirring to prepare a test slurry b. The colloidal silica content of this test slurry b was 12% by mass, and the pH thereof was 9.41. Further, as a result of measurement of ζS, it was −165.56 mV.

Then, polishing was performed for 20 minutes in the same manner as in Example 1 with the exception that the test slurry b was used, and the polishing rate was calculated. As a result, it was 0.044 μm/min.

Comparative Example 3

50 mL of a 1 M-NaNO$_3$ aqueous solution was added to 325 mL of distilled water, followed by stirring. 125 mL of colloidal silica (trade name: ST-50, manufactured by Nissan Chemical Industries, Ltd.) having an average particle size of 30 nm was added thereto with stirring. Thus, a test slurry c was prepared. The colloidal silica content of this test slurry c was 14% by mass, the NaNO$_3$ content thereof was 0.1 mol/L, and the pH thereof was 9.30.

Then, polishing was performed for 20 minutes in the same manner as in Example 1 with the exception that the test slurry c was used, and the polishing rate was calculated. As a result, it was 0.029 μm/min.

Further, ζS at this time was measured in the following manner. That is to say, 50 mL of a 1 M-NaNO$_3$ aqueous solution was added to 325 mL of distilled water, followed by stirring. An aqueous solution of latex particles (average particle size: 204 nm) having a solid concentration of 0.01% was added thereto in a proper amount with stirring to obtain a dispersion. Then, ζS was measured in the same manner as in Example 1. As a result, ζS was −48.93 mV.

Comparative Example 4

125 mL of colloidal silica (trade name: ST-50, manufactured by Nissan Chemical Industries, Ltd.) having an average particle size of 30 nm was added to 375 mL of distilled water with stirring to prepare a test slurry d. The colloidal silica content of this test slurry d was 14% by mass, and the pH thereof was 9.51.

Then, polishing was performed for 20 minutes in the same manner as in Example 1 with the exception that the test slurry d was used, and the polishing rate was calculated. As a result, it was 0.035 μm/min.

Further, as a result of measurement of ζS, it was −165.56 mV.

Example 5

2.5 g of a 0.1 M-polyetheramine (weight average molecular weight: 600) aqueous solution and 2.5 g of a 0.1 M-nitric acid aqueous solution were added to 370 mL of distilled water, followed by stirring. 125 mL of colloidal silica (trade name: ST-XL, manufactured by Nissan Chemical Industries, Ltd.) having an average particle size of 50 nm was added thereto with stirring. Thus, a test slurry E was prepared. The colloidal silica content of this test slurry E was 12% by mass, the molar ratio of polyetheramine to nitric acid was 1, and the pH thereof was 9.23.

Then, polishing was performed for 20 minutes in the same manner as in Example 1 with the exception that the test slurry E was used, and the polishing rate was calculated. As a result, it was 0.109 μm/min.

Further, ζS at this time was measured in the following manner. That is to say, 2.5 g of a 0.1 M-polyetheramine (weight average molecular weight: 600) aqueous solution and 2.5 g of a 0.1 M-nitric acid aqueous solution were added to 370 mL of distilled water, followed by stirring. An aqueous solution of latex particles (average particle size: 204 nm) having a solid concentration of 0.01% was added thereto in a proper amount with stirring to obtain a dispersion. Then, ζS was measured in the same manner as in Example 1. As a result, ζS was −24.30 mV.

Example 6

10 g of a 0.1 M-polyetheramine (weight average molecular weight: 600) aqueous solution and 10 g of a 0.1 M-nitric acid aqueous solution were added to 355 mL of distilled water, followed by stirring. 125 mL of colloidal silica (trade name: ST-XL, manufactured by Nissan Chemical Industries, Ltd.) having an average particle size of 50 nm was added thereto with stirring. Thus, a test slurry F was prepared. The colloidal silica content of this test slurry F was 12% by mass, the molar ratio of polyetheramine to nitric acid was 1, and the pH thereof was 9.34.

Then, polishing was performed for 20 minutes in the same manner as in Example 1 with the exception that the test slurry F was used. Further, ζS was similarly measured. As a result, ζS was −12.21 mV.

Comparative Example 5

12 g of a 0.1 M-polyetheramine (weight average molecular weight: 600) aqueous solution and 8 g of a 0.1 M-nitric acid aqueous solution were added to 355 mL of distilled water, followed by stirring. 125 mL of colloidal silica (trade name: ST-XL, manufactured by Nissan Chemical Industries, Ltd.) having an average particle size of 50 nm was added thereto with stirring. Thus, a test slurry e was prepared. The colloidal silica content of this test slurry e was 12% by mass, the molar ratio of polyetheramine to nitric acid was 1.5, and the pH thereof was 10.5. This slurry was increased in viscosity, and a gelation phenomenon was observed.

Comparative Example 6

6.7 g of a 0.1 M-polyetheramine (weight average molecular weight: 600) aqueous solution and 13.3 g of a 0.1 M-nitric acid aqueous solution were added to 355 mL of distilled water, followed by stirring. 125 mL of colloidal silica (trade name: ST-XL, manufactured by Nissan Chemical Industries, Ltd.) having an average particle size of 50 nm was added thereto with stirring. Thus, a test slurry f was prepared. The colloidal silica content of this test slurry f was 12% by mass, the molar ratio of polyetheramine to nitric acid was 0.5, and the pH thereof was 8.3. This slurry was increased in viscosity, and a gelation phenomenon was observed.

From the relationship between the polishing rate and the zeta potential of the glass substrates in the foregoing Examples and Comparative Examples, it is known that the high polishing rate can be realized by increasing the zeta potential of the glass substrates to −90 mV or more using the test slurries according to the invention, and polishing the glass substrates.

While the invention has been described in detail with reference to specific embodiments thereof, it will be apparent to one skilled in the art that various changes and modifications can be made without departing from the gist and scope of the invention.

This application is based on Japanese Patent Application No. 2008-256322 filed on Oct. 1, 2008, the contents of which are incorporated herein by reference.

INDUSTRIAL APPLICABILITY

According to the invention, a flat plate or the like, such as a glass substrate, can be polished at a high polishing rate by using colloidal silica. Further, although a glass substrate for a magnetic disk usually contains alkali metal oxides or alkaline earth metal oxides, when such a glass substrate is polished with the polishing slurry of the invention, coagulation of colloidal silica as described previously becomes difficult to occur.

The invention claimed is:

1. A polishing slurry, comprising:
    a colloidal silica having an average particle size of 40 nm or more;
    water; and
    a $\zeta$ potential adjusting component,
wherein:
the $\zeta$ potential adjusting component comprises
    at least one water-soluble organic polymer selected from the group consisting of a water-soluble polyether polyamine and a water-soluble polyalkylene polyamine, and
    at least one acid selected from the group consisting of hydrochloric acid, sulfuric acid, nitric acid, nitrous acid and amidosulfuric acid;
the $\zeta$ potential adjusting component contains the acid at a ratio of from 0.6 to 1.4 to the water-soluble organic polymer in terms of molar ratio; and
the polishing slurry has a pH of 8 or more.

2. The polishing slurry according to claim 1, wherein a content of the water-soluble organic polymer is from 0.0001 to 0.5 mol/L.

3. The polishing slurry according to claim 1, wherein the colloidal silica has an average particle size of from 100 nm or less.

4. The polishing slurry according to claim 1, wherein the polishing slurry has a pH of from 9 to 10.

5. A polishing method, comprising polishing an object to be polished, with the polishing slurry according to claim 1.

6. The polishing method according to claim 5, further comprising, during the polishing, adjusting a $\zeta$ potential of a surface of the object to be polished to −90 mV or more.

7. The polishing method according to claim 5, wherein the object to be polished comprises silicate glass, quartz glass or quartz, or a surface to be polished of the object to be polished comprises silicic acid or a silicate.

8. A method for manufacturing a glass substrate for a magnetic disk, said method comprising the polishing method according to claim 5.

* * * * *